Jan. 27, 1959
O. W. BONNAFE
2,870,688
BI-LEVEL BROACHING MACHINE
Filed Dec. 7, 1956
2 Sheets-Sheet 2
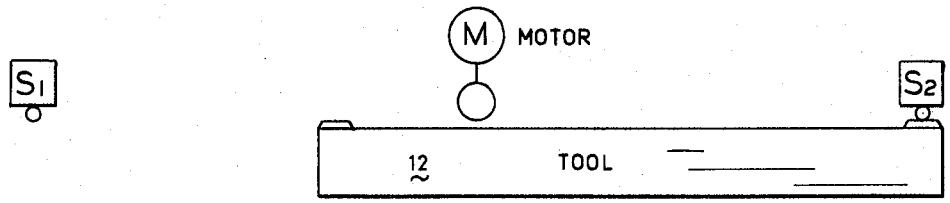
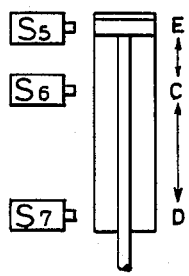
Fig. 4
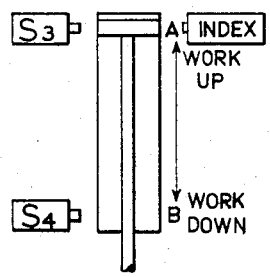
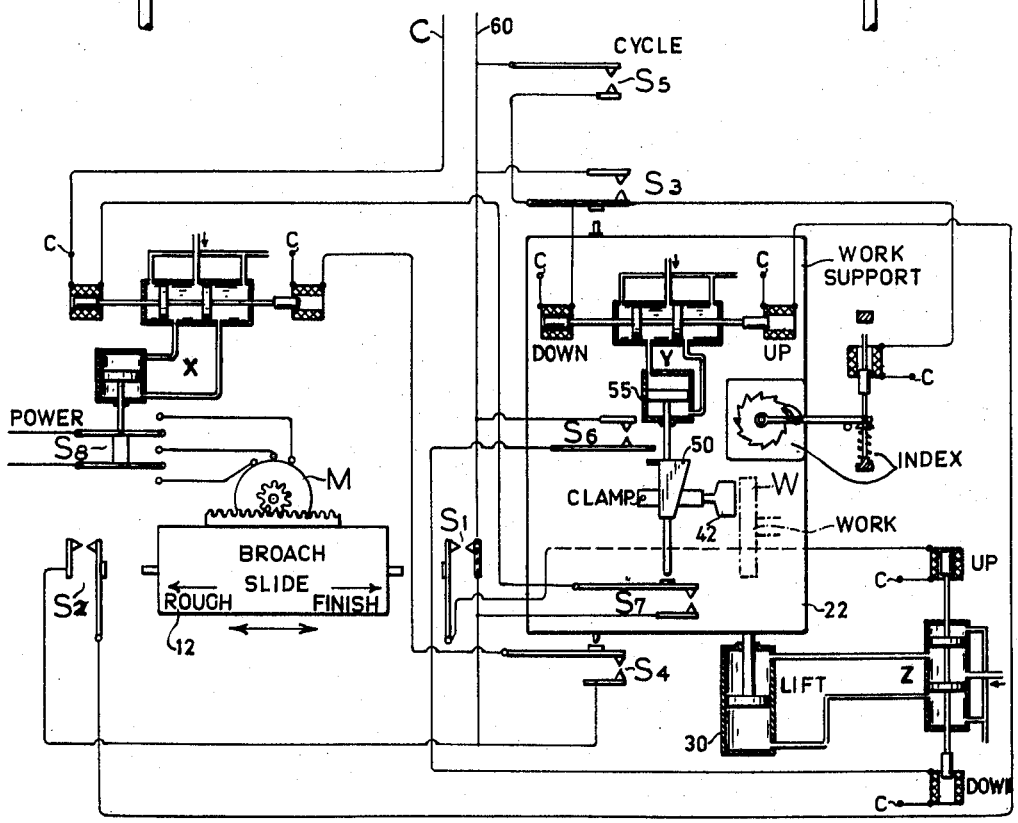
Fig. 5
INVENTOR.
OLIVER W. BONNAFE
BY
Chas. T. Hawley
ATT'Y.

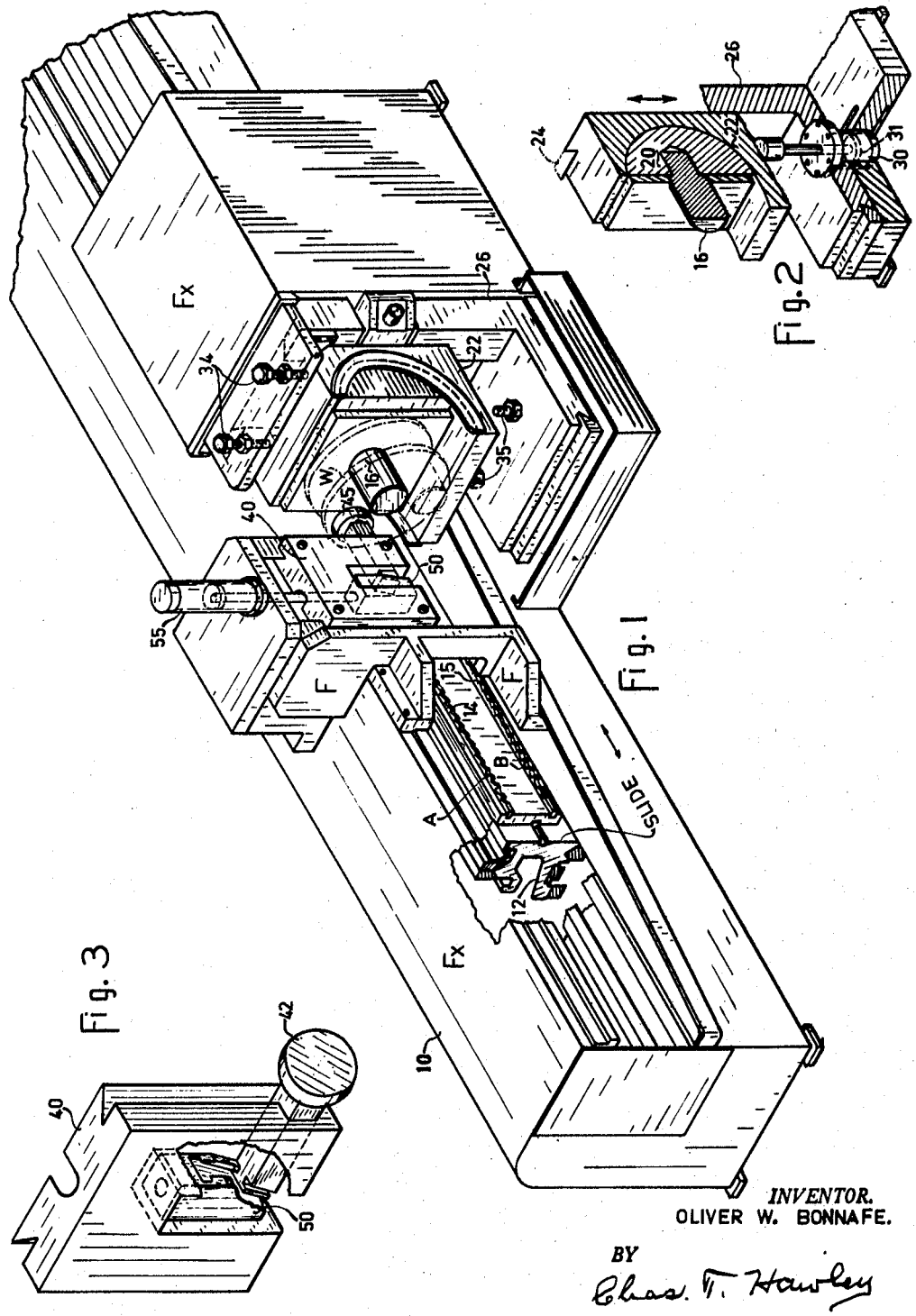

United States Patent Office 2,870,688
Patented Jan. 27, 1959

2,870,688

BI-LEVEL BROACHING MACHINE

Oliver W. Bonnafe, Hudson, Mass., assignor to The Lapointe Machine Tool Company, Hudson, Mass., a corporation of Maine Application December 7, 1956, Serial No. 627,008

1 Claim. (Cl. 90—33)

This invention relates to broaching machines in which exceptionally long broaching cuts are required. As heretofore manufactured, such broaching machines have required floor space in excess of twice the over-all length of the broaches, and when exceptionally long broaches are to be used, the over-all length of the machine has become prohibitive.

It is the general object of my present invention to reduce the required over-all length of the machine by approximately 50% by using two half-length broach portions which cut in opposite directions, the machine making a roughing cut when the broaching slide is moving in one direction and making a finishing cut when the slide is moving in the opposite or return direction. This construction and procedure eliminates the lost time of the previous idle return stroke and saves much valuable floor space.

My invention further relates to arrangements and combinations of parts which will be hereinafter described and more particularly pointed out in the appended claim.

A preferred form of the invention is shown in the drawings, in which:

Fig. 1 is a perspective view of the improved bi-level broaching machine, which is shown as particularly adapted to the broaching of the blank hubs or discs in which the blades of turbine rotors are to be mounted;

Fig. 2 is a partial sectional elevation in perspective of the work-elevating structure;

Fig. 3 is a front elevation in perspective of a work-clamping device;

Fig. 4 is a diagrammatic view illustrating the succession of operative steps in the broaching cycle; and Fig. 5 is a diagrammatic view showing illustrative automatic control mechanism for my improved bi-level broaching machine.

Referring particularly to Fig. 1, I have shown a broaching machine comprising an elongated main frame 10 having suitable guide-ways for a broaching slide 12. A roughing broach portion 14 and a finishing broach portion 15 are secured in vertically-spaced relation on the front of the slide 12, and are adapted to make successive roughing and finishing cuts in a piece of work W rotatably mounted on a stud 16.

The broach portions 14 and 15 may be visualized as parts of an extremely long broach which has been cut in two in the middle, and these broach portions have been thereafter mounted on the slide 12 with the lower or finishing broach portion 15 reversed in position. Any suitable mechanical or hydraulic driving mechanism may be provided to reciprocate the slide 12.

The stud 16 may support the work W with a light drive fit and is mounted in a segmental block 20 (Fig. 2) which in turn is mounted for angular adjustment in a work support or bracket 22. The bracket 22 is mounted in vertical guide-ways 24 in a rigid frame member 26, and a hydraulic cylinder 30 and piston 31 are provided for moving the support or bracket 22 upward and downward. Suitable stops 34 and 35 (Fig. 1) may be adjusted to limit vertical travel in both directions.

A fixed auxiliary frame F is mounted on the main frame 10 alongside the work-supporting frame 26, and the frame F is provided with a slidable plate 40 (Fig. 3) in which a work-engaging member 42 is slidably mounted. A wedge-bar 50 is mounted for vertical movement in the plate 40 and may be lowered and raised by a fluid-operated cylinder 55.

The plate 40 may be moved upward in its vertical guides to provide clearance for re-loading.

*Operation*

The work-supporting bracket 22 is shown raised, so that the next portion of the work to be broached will be at the level of the upper or roughing broach portion 14. The clamping wedge 50 is then forced downward to press the clamping member 42 firmly against the work W. The broach slide 12 then moves to the left and the broach portion 14 makes its roughing cut.

As the broach portion 14 completes its cut and leaves the work, the clamping wedge 50 is raised, and the bracket 22 and the work W are lowered by the cylinder parts 30—31 to bring the work to the level of the lower or finishing broach portion 15. The broach slide 12 then returns to the right and provides a finishing cut. During this return stroke, the work W is pressed firmly against the segmental block 20 by the broaching pressure and does not require clamping.

On completion of the finishing cut, suitable indexing mechanism shown diagrammatically in Fig. 5 rotates the work one step, and the roughing and finishing cuts on the next successive portion of the blank W are then automatically performed. The machine continues to operate until all of the required cuts are made in the blank or work-piece, after which the machine comes to rest with the clamping device 50 in extreme raised position to facilitate reloading.

In Fig. 5, illsutrative control mechanism is shown. The broaching slide is indicated at 12, the work-supporting bracket at 22, the work-lifting cylinder at 30, the clamping wedge at 50, and the clamping cylinder at 55. The mechanism for controlling the travel of the broach slide is indicated at X, the work-clamping mechanism at Y, and the work-elevating mechanism at Z.

A supply wire for the various control devices is indicated at 60 and a common return wire at C. Return wires from the various control devices are indicated at c and may be assumed to be connected to the main return wire C, but with the return connections omitted for clearness.

The general positions of the control switches are indicated diagrammatically in Fig. 4, in which a starting switch is shown at S5 and upper and lower switches S6 and S7 are associated with the clamping cylinder 55 which operates the wedge 50. Reverse switches S1 and S2 are associated with the broaching slide 12, and switches S3 and S4 are associated with the vertically-movable work-supporting bracket 22.

The automatic operation may be briefly described as follows: The operator momentarily closes the starting switch S5, thus energizing the left-hand solenoid in the clamping unit Y and causing the wedge 50 to move downward to cause the member 42 to clamp the work W. As the wedge 50 moves downward, it engages and closes a switch S7 which energizes the left-hand solenoid in the unit X and thereby closes the reversing main switch S8 of the motor M and causes the broach slide 12 to move to the left for a roughing cut.

As this cut is completed, switch S2 is closed, which energizes the right-hand solenoid coil in the unit Y and reverses the operating connections to raise the clamping wedge 50.

As the wedge moves upward, it engages and closes a switch S6 which energizes the lower solenoid in the unit Z, causing the work-support 22 to move downward to bring the work opposite the finish broach portion 15. As this downward movement is completed, the switch S4 is closed, energizing the right-hand coil in the unit X, and thus reversing the main switch S8 and causing the slide 12 to move to the right for a finishing cut.

As this cut is completed, the switch S1 is engaged, which energizes the upper solenoid in the unit Z and causes the work support 22 to return to raised position. In so doing, a switch S3 is closed, which operates a suitable index device to advance the work one space, and also energizes the left-hand solenoid of the unit Y to lower the wedge 50 and again clamp the work in broaching position. These parts are timed to cause the index device to operate more quickly than the wedge.

The wedge 50 then closes the switch S7 to start the next broaching operation. When all teeth are broached, the main switch S8 is opened automatically to stop the machine.

Having thus described my invention and the advantages thereof, I do not wish to be limited to the details herein disclosed, otherwise than as set forth in the claim, but what I claim is:

In a broaching machine, a frame, a broach holder means mounting said broach holder for sliding movement in a fixed path, means supporting a two-part broach having its broaching parts reversely mounted and fixed in said broach holder, a workholder, means to shift said workholder transversely with respect to the line of broach travel alternately and in an opposite direction at the end of each broaching stroke, means mounted on said frame and movable toward said workholder to force the work firmly against the workholder and against movement relative thereto during a broaching stroke which tends to move the work away from the workholder, and means to actuate said force-applying means including the release of said force-applying means at the end of such broaching stroke to thereby permit free transverse shifting movement of the workholder and work relative to the broaches and relative to said force-applying means.

References Cited in the file of this patent

UNITED STATES PATENTS

| | | |
|---|---|---|
| 559,880 | Wolff | May 12, 1896 |
| 580,171 | Allen | Apr. 6, 1897 |
| 1,684,139 | Oakley et al. | Sept. 11, 1928 |
| 1,684,140 | Perkins et al. | Sept. 11, 1928 |
| 2,617,333 | Fox | Nov. 11, 1952 |